United States Patent [19]
Cumens et al.

[11] Patent Number: 5,570,632
[45] Date of Patent: Nov. 5, 1996

[54] APPARATUS AND METHOD FOR APPLYING AND VERIFYING MARKS ON THE PERIPHERY OF GENERALLY CYLINDRICALLY-SHAPED OBJECTS

[75] Inventors: Christopher Cumens, West Chester; Charles Papciak; Eric E. Shoup, both of Exton; James W. Sloan, Spring City; Edward F. Vander Bush, Exton, all of Pa.

[73] Assignee: The West Company, Incorporated, Lionville, Pa.

[21] Appl. No.: 409,470

[22] Filed: Mar. 23, 1995

[51] Int. Cl.⁶ .................................................. B41F 17/18
[52] U.S. Cl. ............................................. 101/35; 101/44
[58] Field of Search ................................. 101/35, 37, 39, 101/40, 41, 42, 43, 44; 382/219, 321, 322, 323, 324, 143, 144

[56] References Cited

U.S. PATENT DOCUMENTS

| | | |
|---|---|---|
| 2,783,389 | 5/1950 | Cummings et al. |
| 2,971,646 | 2/1961 | Coffey. |
| 3,351,198 | 11/1967 | Wyman. |
| 3,409,129 | 11/1968 | Sperry. |
| 3,613,885 | 10/1971 | Rehse. |
| 3,802,559 | 4/1974 | Luchetti et al. |
| 4,596,107 | 6/1986 | Pfleger, Sr. |
| 5,053,609 | 10/1991 | Priddy et al. ............................. 235/436 |
| 5,134,932 | 8/1992 | Fujino ........................................ 101/44 |
| 5,136,948 | 8/1992 | Fujino et al. ............................ 101/486 |
| 5,207,153 | 5/1993 | Thomason ................................ 101/35 |
| 5,226,361 | 7/1993 | Grant et al. .............................. 101/44 |
| 5,307,420 | 4/1994 | Fujino et al. ................................ 382/8 |
| 5,392,359 | 2/1995 | Futamura et al. .......................... 382/8 |
| 5,423,252 | 6/1995 | Yamamoto et al. ...................... 101/35 |
| 5,479,853 | 1/1996 | Carroll et al. ............................. 101/44 |

OTHER PUBLICATIONS

Descriptive material entitled "Base Coding Diverter" from Transpec Limited (28 unnumbered pages).
Descriptive material distributed by International Data Matrix, Inc. (19 unnumbered pages).
McCracken, Bill et al, "2D Codes Provide Larger Data Capacity for Automatic Identification Applications", December 1994 I&CS, pp. 57-60, 63-64.

*Primary Examiner*—Ren Yan
*Attorney, Agent, or Firm*—Panitch Schwarze Jacobs & Nadel, P.C.

[57] ABSTRACT

An apparatus for applying and verifying a printed mark on the periphery of generally cylindrically-shaped objects as they travel on a path. The apparatus comprises at least a first conveyor mounted for movement on a first side of the path. The first conveyor is located to engage the objects to translate the objects at a known translational velocity along the path. A transport assembly is mounted for cyclic movement back and forth along a transport assembly path parallel to the path of the objects at least part of the cyclic movement being approximately at the known translational velocity of the objects. A mark applicator is mounted on the transport assembly and is located in a position to apply a mark on each object as the object is translated by the first conveyor. A sensor is mounted on the transport assembly. The sensor is located in a position to read the applied mark on each object as the object is translated by the belt. The sensor generates a signal representative of the mark.

20 Claims, 6 Drawing Sheets

5,570,632

APPARATUS AND METHOD FOR APPLYING AND VERIFYING MARKS ON THE PERIPHERY OF GENERALLY CYLINDRICALLY-SHAPED OBJECTS

FIELD OF THE INVENTION

The present invention relates to an apparatus and method for applying and verifying marks on the periphery of generally cylindrically-shaped objects, and more particularly to an apparatus and method for applying and verifying a mark on pharmaceutical vials after filling and capping, to identify the contents, lot number, expiration date and/or provide other related data regarding the contents of the vial.

BACKGROUND OF THE INVENTION

In the pharmaceutical industry, it is extremely important that the correct label be placed upon containers, bottles or vials to correctly identify the pharmaceuticals contained therein. An incorrect label upon a container might easily result in the improper use of the contents. This could have severe consequences to a patient who receives the wrong drug or the wrong dosage of a drug because of an improper label on the container. Because of the seriousness of the consequences of mislabeling, automatic label verification as close to the filling and sealing station is desireable. The FDA is also mandating a two-person verification for cut labels supplied with pharmaceutical products.

A problem with manual inspection systems is that the accuracy of the method is dependent upon the individual inspectors, and the element of human error is always present. Furthermore, where a large number of containers or vials are being filled, such as in pharmaceutical manufacturing facilities, many persons may be required for the sole purpose of inspecting the labels. Such manual and visual inspection is not cost-effective and does not preclude human error.

Automated label inspection systems are known in the art. Such automated systems generally apply a label to a container or vial after if has been filled, sealed, and autoclaved. Generally, labeling of the vial is the last step, and several additional handling steps occur between the time the vial is filled with the pharmaceutical product and sealed, and the time that the label is applied. The possibility for mishandling during any of these further processing steps is always present.

In one known system, after the containers or vials are filled and sealed, and after the completion of any further processing, labels are applied to the bottles or vials. After the labels are applied, each container or vial is inspected to make sure that it does not have either an incorrect or improperly positioned label. The inspection is done with a scanning disk having a plurality of openings defined therethrough and a focusable optical system. A photocell is positioned to receive light passing through the optical system. A plurality of photographic facsimiles of the correct label are positioned in the openings in the scanning disk. As the containers pass the scanning disk, they are scanned and, if the label is improperly positioned or does not match the markings on the scanning disk, the bottle bearing the improperly positioned or incorrect label is rejected.

Another known apparatus uses an optical scanner to inspect articles following the labeling operation. The optical system detects the presence or absence of a label on each article. Unlabeled articles are removed from the conveyor line.

Another known prior art system applies printed matter to objects moving on a conveyor line by rotating the objects as they are carried under one or more print heads. The print heads are mounted for reciprocating movement adjacent to the path of the moving objects, and are moved at the same rate as the objects to present a stationary surface on the object for printing. Two objects can be printed at the same time. This system is, however, only a marking system, and does not attempt to verify if the mark has been properly applied and is readable. One known system of this type is disclosed in U.S. Pat. No. 5,207,153.

Finally, another known system marks and inspects articles, such as integrated circuit chips (IC's), traveling on an air track. Each IC is stopped at a fixed position printer station and is marked using a pad-ink transfer method. After each IC is marked, it is released and travels to a fixed vision system for inspection for verification and the mark is checked against a reference standard by a computerized, high-speed vision system using pattern recognition software. If the mark is determined to be sub-standard, the object is directed to a reject path. Acceptable parts pass on for further processing.

Of the known systems described above, the first two systems are concerned with inspecting a label which is applied to a container or vial after the container or vial has been filled, sealed and further processed. Generally, labeling of the vial is the last step, and several additional handling steps occur between the time the vial is filled with the pharmaceutical product and sealed, and the time that the label is applied. The possibility for mishandling during any of these further processing steps is not addressed by these known prior art systems, and although it may be believed that the correct label is being applied, nothing verifies whether the label is in fact being applied to a sealed vial having the correct contents. The third system described above is only concerned with applying a mark to an object traveling on a conveyor. In the fourth system described above, each object must be stopped on its path for both marking and inspection, which can slow down a production line unless several marking and inspection stations are utilized.

The present inventors recognized the shortcomings of the known prior art systems in failing to provide a system of marking a pharmaceutical vial or container immediately after it has been filled and sealed, and prior to any further processing, with an identification mark which identifies the pharmaceutical contents and other critical information regarding the contents of the container or vial and further failing to immediately verify the mark prior to any further processing.

SUMMARY OF THE INVENTION

Briefly stated, the present invention provides an apparatus for applying and verifying a mark applied on the periphery of generally cylindrically-shaped objects as they travel on a path. The apparatus comprises at least a first conveyor mounted for movement on a first side of the path. The first conveyor is located to engage the objects to at least translate the objects at a known translational velocity along the path. A transport assembly is mounted for movement back and forth along a transport assembly path parallel to the path of the objects at the known translational velocity of the objects. A mark applicator is mounted on the transport assembly and is located in a position to apply a machine readable mark on each object as the object is translated by the first conveyor.

A sensor is mounted on the transport assembly. The sensor is located in a position to read the applied mark on each previously marked object as the object is translated by the conveyor and to generate a signal representative of the read mark.

The present invention also provides a method for applying and verifying a mark applied on the periphery of generally cylindrically-shaped objects as they travel on a path. The method comprises the steps of:

(a) uniformly spacing the objects on the path;

(b) simultaneously rotating and translating the objects at a predetermined translational velocity and a predetermined rotational velocity;

(c) translating a mark application along the object path;

(d) applying a machine readable mark with the applicator on the periphery of a first object as it is being rotated and translated;

(e) translating a sensor along the object path;

(f) reading the applied mark on the first object with the translating sensor after the mark has been printed; and (g) simultaneously performing steps (d) and (f) on more than one object.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF PREFERRED EMBODIMENT

Figure 1:
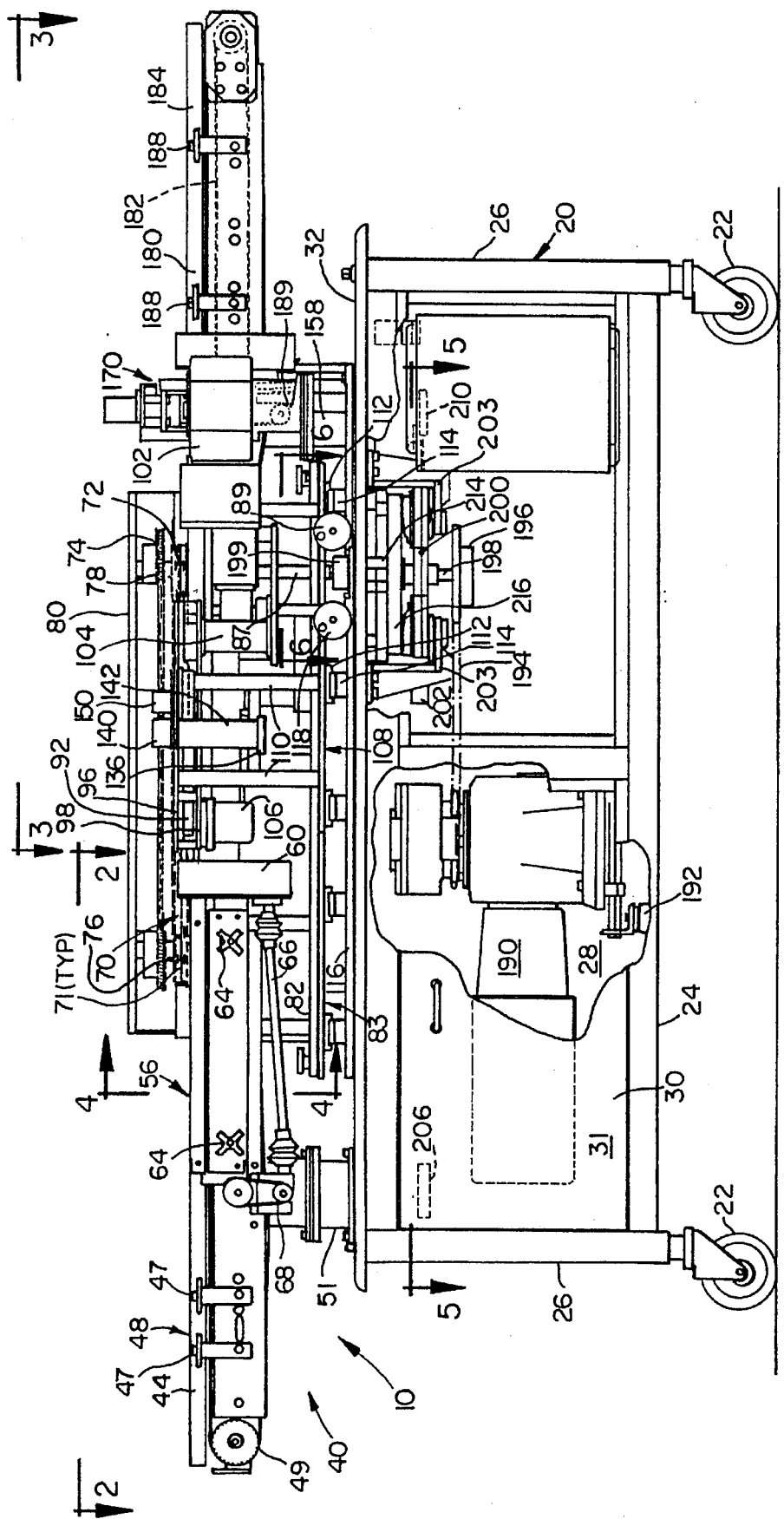
FIG. 1 is a front elevational view of a preferred embodiment of an apparatus for applying and verifying a printed mark on a periphery of a generally cylindrically-shaped object.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the apparatus for applying and verifying a printed mark on the periphery of generally cylindrically-shaped objects and designated parts thereof. The terminology includes the words above specifically mentioned, derivatives thereof and words of similar import.

Referring to the drawings, wherein like numerals indicate like elements throughout and multiple elements of the same type in a single figure have been indicated as typical (i.e. "(TYP)"), there is shown in FIGS. 1–7 a preferred embodiment of an apparatus for applying and verifying an applied mark on the periphery of generally cylindrically-shaped objects (hereinafter the "marking and verifying apparatus 10") in accordance with the present invention.

Figure 8:
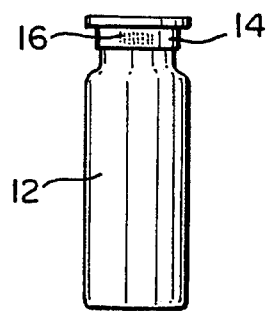
FIG. 8 is a elevational view of a pharmaceutical vial with a printed mark.

In the preferred embodiment, the marking and verifying apparatus 10 is for use on injection pharmaceutical production lines which fill and seal vials, and is located after the vial sealing equipment. The marking and verifying apparatus 10 applies a machine readable mark 16, preferably in the form of a traceable code (as shown in FIG. 8), to a sealed, unlabeled vial 12 on the aluminum seal 14 by printing the mark on the seal and verifies that the mark 16 is accurate. Generally, marked vials 12 then travel further on a path (typically a conveyor) for further processing. It is understood by those of ordinary skill in the art that the size of the vial 12 may be varied depending on the product, concentration, and single-dosage versus multiple-dosage containers. In the preferred embodiment, the mark 16 is a data matrix code as described in U.S. Pat. No. 5,053,609, which is incorporated herein by reference as if fully set forth. However, it will be appreciated by those of ordinary skill in the art from the present disclosure that any type of mark, such a linear bar code, a string of alphanumeric characters or other characters or codes, may be used as long as the mark can be machine read and associated with sufficient information to properly identify each vial 12 during subsequent inspection. For the sake of convenience, the description which follows is made with reference to the marking and verifying of marks on vials 12. However, it is understood that the marking and verifying apparatus can be used to apply and verify machine readable marks of any type on any generally cylindrically-shaped objects or containers and the invention is not limited to the preferred application of printing and verifying printed marks on vials 12.

Figure 2:
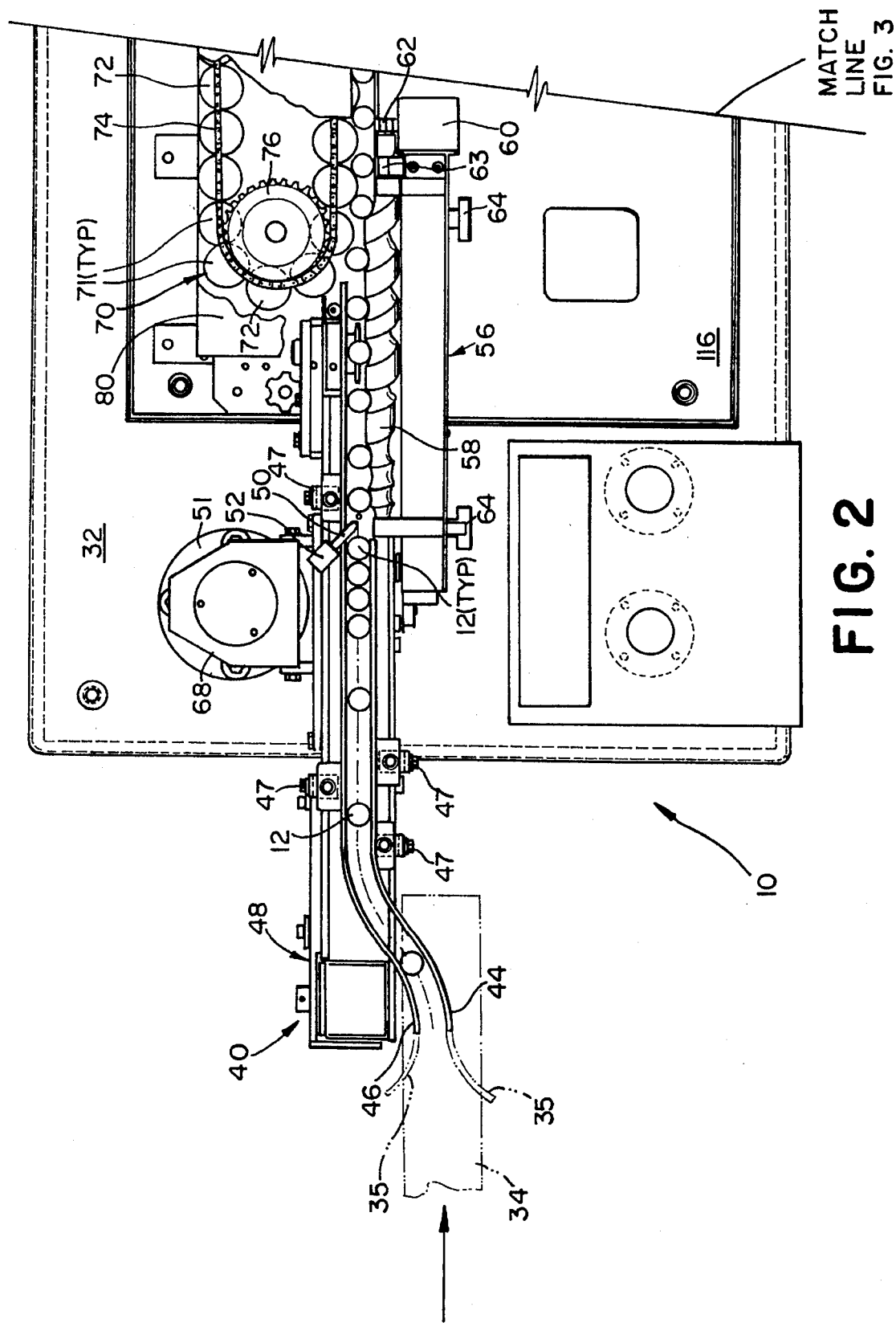
FIG. 2 is a top-plan view taken along line 2—2 in FIG. 1.
Figure 3:
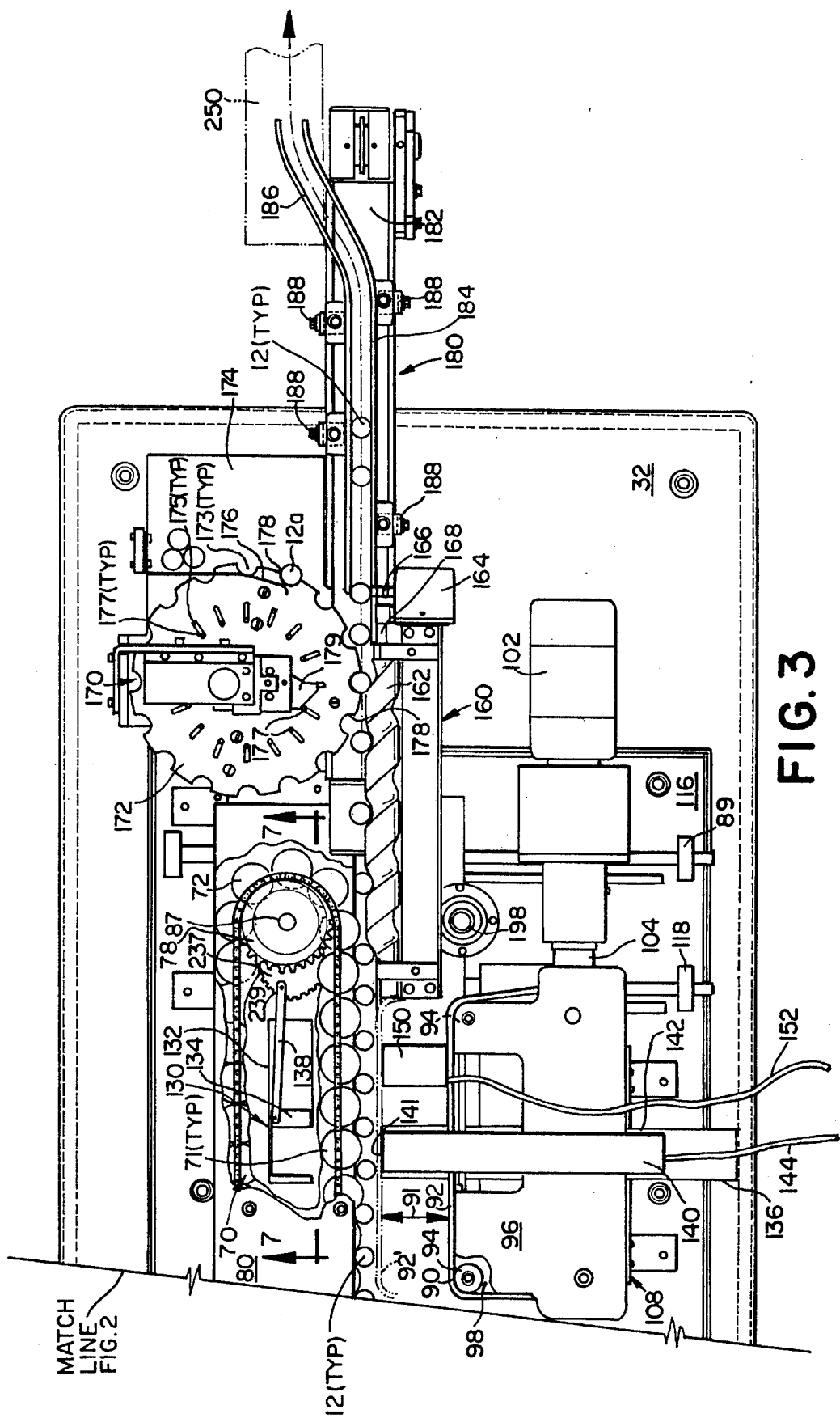
FIG. 3 is a top-plan view taken along line 3—3 in FIG. 1.

Referring now to FIGS. 1–3, the preferred marking and verifying apparatus 10 is comprised of a stand 20 mounted for movement on castors 22. The stand 20 includes a base 24, two sides 26, a back wall 28, a front wall 30, having removable access panels 31, and a top support surface 32. Preferably, the stand 20 is a welded assembly made from sheet metal with the top 32 being a steel plate. However, it is understood by those of ordinary skill in the art from the present disclosure that the stand 20 could be made from various other materials, such as polymeric materials, aluminum or other suitable metal. It is similarly understood that the stand 20 need not be mounted on castors 22 and may be mounted directly on a support surface. Finally, it is also similarly understood that the size and the shape of the stand 20 can be tailored to suit specific applications.

Still with reference to FIGS. 1–3, the marking and verifying apparatus 10 has a conveyance system preferably formed by a plurality of separate, cooperating conveyors which space the vials uniformly and which translate and preferably rotate the vials at predetermined velocities. However, a single indexing system might be used if permitted by the particular mark applying and verifying process employed. An infeed side, generally designated as 40, feeds the vials 12 or other cylindrically-shaped objects into the marking and verifying apparatus 10. The vials 12 are fed from an upstream conveyor 34 (indicated in phantom) or other source to the marking and verifying apparatus 10. The vials 12 are directed by guide rails 35 (in phantom) to toward an opening 42 formed between first and second infeed guide rails 44 and 46. The infeed guide rails 44 and 46 have an infeed end located over the upstream conveyor 34 and curve to a position over an infeed conveyor assembly 48, described in more detail below. The infeed guide rails 44 and 46 are held in position by adjustable mounts 47 affixed to the infeed conveyor assembly 48. The construction of adjustable mounts 47 for guide rails 44 and 46 is known to those of ordinary skill in the art. Accordingly, no further description is provided. Preferably, the guide rails 44 and 46 are made of stainless steel strips and are mounted for movement closer to and further apart from each other to accommodate different-sized vials 12. It is understood by those of ordinary skill in the art from the present disclosure that the guide rails 44 and 46 can be made of other materials and may be fixed-mounted, if desired, depending on the particular application.

The infeed conveyor assembly 48 is mounted on a support column 51 affixed to the top 32 of the stand 20, and includes an infeed conveyor belt 49. The infeed conveyor assembly 48 is of the type generally known to those of ordinary skill in the art, and accordingly, further description of the infeed conveyor assembly 48 is not believed to be necessary. However, other types of infeed conveyor assemblies, such as roller conveyors or the like may be used, if desired.

A stop pin 50 is located over the infeed conveyor assembly 48 in a position which intersects the path defined between the guide rails 44 and 46. Preferably, the stop pin 50 is actuated by a solenoid assembly 52, and the pin 50 is moveable between an extended position (as shown in FIG. 2) and a retracted position in which the pin 50 is withdrawn from the path formed between the guide rails 44 and 46. It is understood by those of ordinary skill in the art that other types of stop mechanisms, such as a stop gate (not shown), can be used in accordance with the present invention, and the type of stop/escapement mechanism is not considered to be critical or limiting.

Referring to FIGS. 1 and 2, the marking and verifying apparatus 10 further comprises an infeed screw assembly 56 mounted to the infeed conveyor assembly 48, for rotational movement adjacent to the path of the vials 12 on the infeed conveyor belt 49. The infeed screw assembly 56 is mounted for lateral movement in a direction normal to the path of the infeed conveyor belt 49, and the position of the infeed screw 58 is adjustable by use of knobs 64 located at the upstream and downstream ends of the infeed screw assembly 56 to accommodate different-sized vials 12.

The infeed screw assembly 56 includes a tapered infeed screw 58 mounted on a shaft 63. The upstream end of the infeed screw 58 is located adjacent to and overlaps a portion of the downstream end of the infeed conveyor belt 49, in an aligned position with the downstream end of the first infeed guide rail 44. An infeed screw gear box 60 drives gear 62 which is attached to the shaft 63 to rotate the infeed screw 58. As shown in FIG. 1, the infeed screw gear box 60 is driven by a drive shaft 66, which extends from the infeed conveyor/screw assembly gear box 68, located on the infeed conveyor support column 51.

In the preferred embodiment, the infeed screw 58 has a tapered lead and has a pitch of approximately 5.1 cm (2.0 inches). The screw is preferably rotated between two and 640 revolutions per minute. Preferably, the infeed screw 58 is made of a polymeric material, such as nylon. However, it is understood by those of ordinary skill in the art that the infeed screw 58 can be made from various other materials such as aluminum or other suitable metals or polymeric materials. Preferably, the drive shaft 64 includes two universal joints to compensate for angular changes caused by repositioning the infeed screw assembly 56 to accommodate different-sized vials 12. Additionally, it is similarly understood by those of ordinary skill in the art that the pitch and speed of the infeed screw assembly 56 can be varied, as desired, to suit particular applications. For example, the pitch can be 7.6 cm (3.0 inches), 10.2 cm (4.0 inches) or any other size to accommodate different sized vials.

Referring now to FIGS. 1–3, the marking and verifying apparatus 10 further comprises at a first continuous conveyor assembly 70 including at least a first conveyor 72, formed by linked vertical rollers 71, which is mounted for movement on a first side of the path of the vials 12. A platform 73 is located under the conveyor 72 to support the vials 12. The first conveyor 72 of linked vertical rollers 71 is located to engage the vials 12 to rotate and translate the vials 12 at a known translational velocity and a known rotational velocity along the path, while maintaining the pitch or spacing between the vials 12. The first conveyor assembly 70 and the first conveyor 72 are located adjacent to the path of the vials 12 on the opposite side of the path from the infeed screw 58 such that the downstream end of the infeed screw 58 overlaps with the first conveyor 72 of linked vertical rollers 71. The first conveyor assembly 70 is driven by a chain 74 which engages sprockets 76 and 78 at the upstream and downstream ends of the first conveyor assembly 70 to drive the first conveyor 72 of linked vertical rollers 71. Sprocket 76 is attached to a drive shaft 87. Preferably, a shroud 80 (which has been partially broken away for clarity in FIGS. 2 and 3) is located over the sprockets 76, 78 and chain 74.

Figure 4:
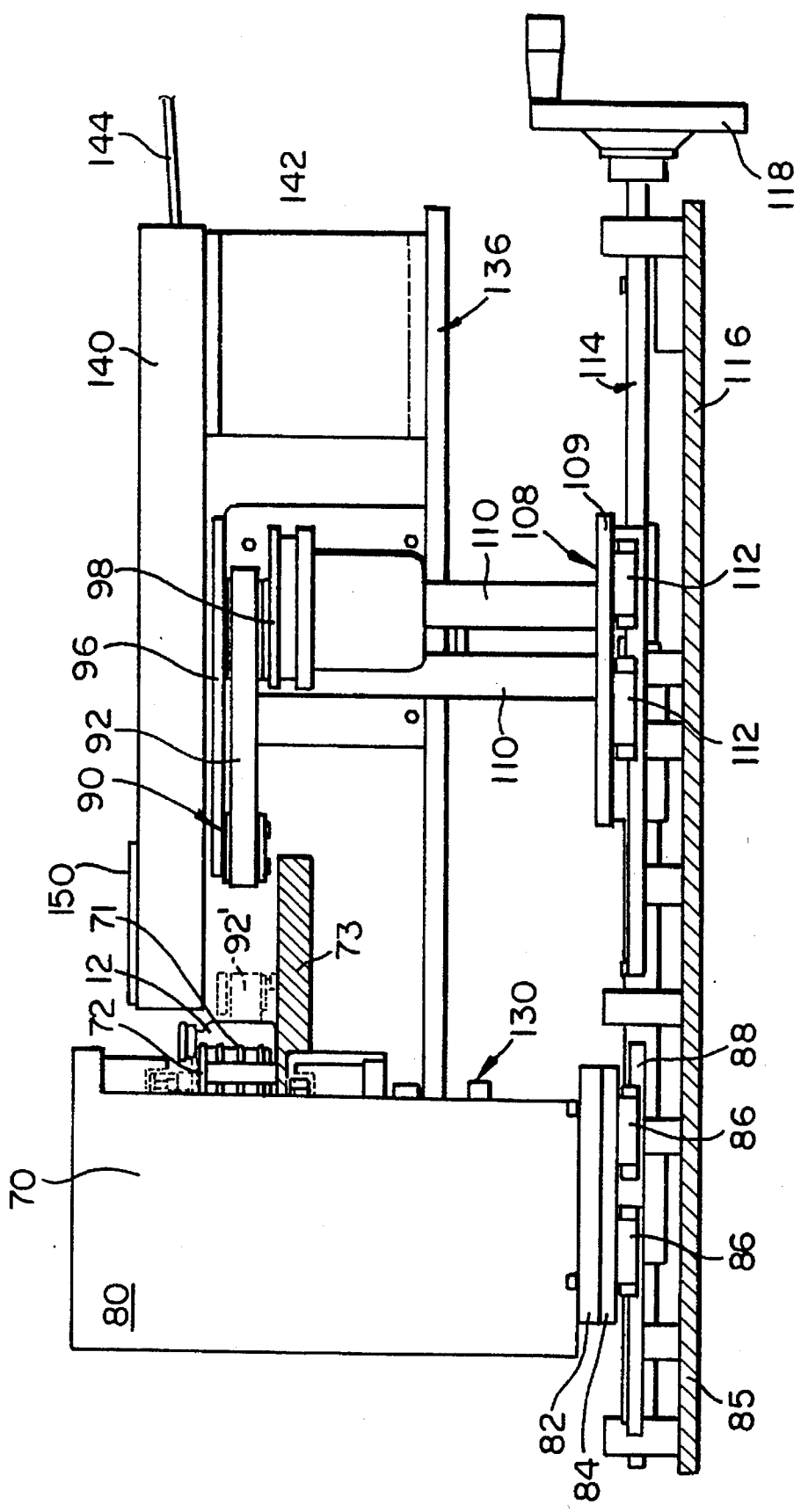
FIG. 4 is a sectional view taking along line 4—4 in FIG. 1.
Figure 7:
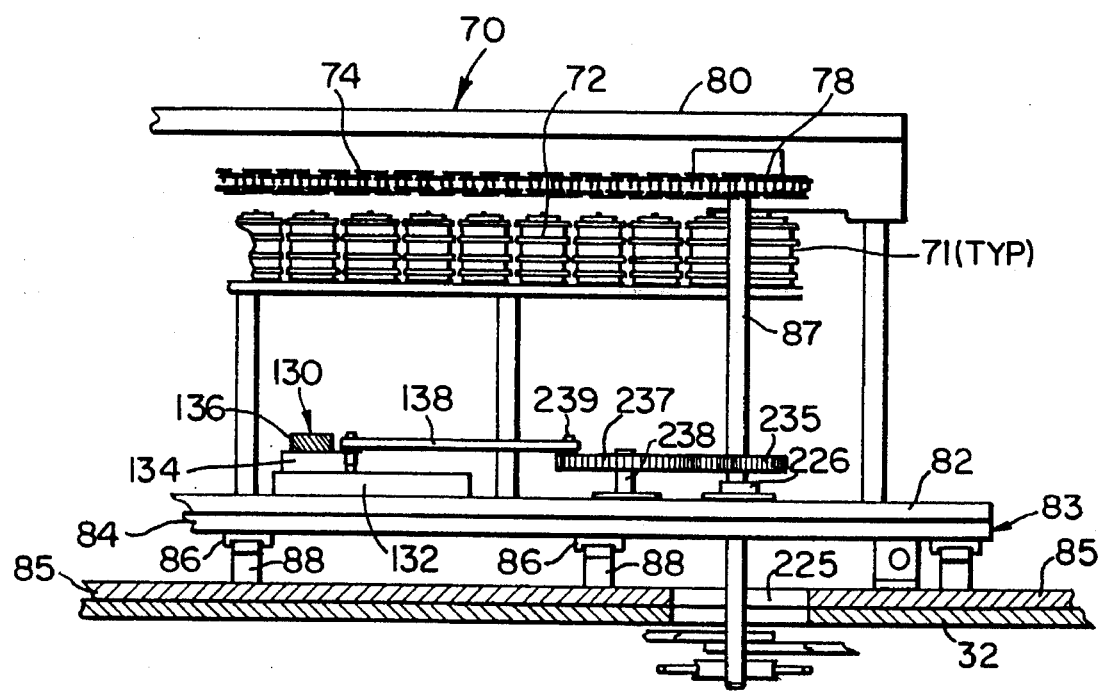
FIG. 7 is a sectional view taking along line 7—7 in FIG. 3.

As shown in FIGS. 1, 4 and 7, the first conveyor assembly 70 has a base plate 82 which is mounted to an adjustable platform assembly 83, which is affixed to the top 32 of the stand 20, for movement of the first conveyor assembly 70 toward and away from the path of the vials 12. In FIGS. 4 and 7, the adjustable platform assembly 83 includes an upper platform 84 and a lower platform 85. A plurality of guides 86 depend from the upper platform 84 and are slidably disposed on rails 88 which are attached to the lower platform 85. A hand crank 89 (FIG. 1) attached to a lead screw (not shown), is used to adjust the position of the upper platform 84 and the first conveyor assembly 70 supported thereon, moving the first conveyor assembly 70 in a direction normal to the path of the vials 12 and the plane of FIG. 1 in order to accommodate different-sized vials 12.

In the preferred embodiment, the first conveyor assembly 70 includes a first roller-chain conveyor 72. Preferably, the linked vertical rollers 71 have a pitch of approximately 5.1 cm (2.0 inches), which is approximately equal to the pitch of the infeed screw 58. However, it is understood by those of ordinary skill in the art from the present disclosure that other conveyors, such as a belt-type conveyor (not shown) or an auger screw assembly (not shown) could be used to translate and rotate the vials 12 while maintaining the pitch between the vials 12. Additionally, it is similarly understood that the first conveyor assembly 70 could be mounted directly to stand 20 without an adjustable platform assembly 83, depending on the particular application.

Referring now to FIGS. 1, 3 and 4, the marking and verifying apparatus 10 further comprises a second conveyor assembly 90 including a second conveyor in the form of a continuous belt 92 mounted for movement on an opposite side of the path of the vials 12 from the first conveyor assembly 70 and conveyor 72. The second conveyor belt 92 is located to engage the opposite sides of the vials 12 from the conveyor 72 of linked vertical rollers 71 of the first conveyor assembly 70. The first and second conveyors 72 and 92 of the first and second conveyor assemblies 70 and 90 cooperate to rotate and translate the vials 12 at a known translational velocity and a known rotational velocity along the path of the vials 12.

Referring to FIG. 3, the second conveyor belt 92 is mounted on rollers 94 supported between plates 96 and 98. The second conveyor belt 92 is driven by a parallel shaft gear motor 102 which is connected to a 90° output gear box 104 which engages a drive roller (not shown) engaging the belt. However, it is understood by those of ordinary skill in the art that various types of motors, such as a stepper motor, could be used if desired.

Referring to FIGS. 1 and 4, preferably, a shaft encoder 106 is connected to a roller 94 contacting belt 92 to track the speed of the belt 92.

Referring now to FIGS. 1, 3 and 4, the second conveyor assembly 90 is mounted on an adjustable platform assembly 108 for movement toward and away from the path of the vials 12. The second conveyor assembly 90 is shown in solid in the away position in FIG. 3. The belt 94 is also shown in the engaged position in contact with the sides of the vials 12 in phantom at 92', with the direction of movement indicated by the arrow 91 in FIG. 3. Supports 110 connect the upper and lower support plates 96 and 98 of the second conveyor 90 to an upper platform 109 of the adjustable platform assembly 108. A plurality of guides 112 depend from the upper platform 109 and slidably engage rails 114 affixed to a lower platform 116. The lower platform is mounted on the top 32 of the stand 20. The guides 112 and rails 114 are oriented in a direction normal to the path of the vials 12. A hand crank 118 affixed to a lead screw (not shown) is used to adjust the position of the second conveyor assembly 90 in a direction normal to the path of the vials 12 between a first position, away from the path of the vials 12, as shown in FIG. 3, to a position where the belt 92' (shown in phantom in FIG. 3) is contact with the sides of the vials 12 in order to provide access to the second conveyor assembly and to accommodate different sized vials 12.

Referring to FIGS. 3, 4 and 7, the marking and verifying apparatus 10 further comprises a transport assembly 130 mounted to the base plate 82 of the first conveyor assembly 70. The transport assembly 130 is mounted for cyclic movement back and forth along a transport assembly path parallel to the path of the vials 12 at least momentarily at the known translational velocity of the vials 12 during each cycle. The transport assembly 130 includes a linear motion table 132 mounted to the base plate 82 beneath the first conveyor assembly 70. The linear motion table 132 has a movable carriage 134 which moves in a direction parallel to the path of the vials 12. A beam 136 is mounted to the carriage 134. The beam 136 extends from beneath the first conveyor assembly 70, under the platform 73 which supports the vials 12, and beneath the second conveyor belt 92. A first end of a link 138 is pivotally connected to the carriage 134 of the linear motion table 132 to drive the carriage 134 in a reciprocating motion. In the preferred embodiment, the linear motion table 132 is located under the first conveyor assembly 70; however, it is understood by those of ordinary skill in the art that the linear motion table 132 could be located in other positions, such as on a separate support adjacent to the path of the objects or vials 12.

Referring now to FIGS. 1, 3 and 4, a mark applicator preferably in the form of a printer 140 is removably attached to the transport assembly 130 by a bracket 142 affixed to the beam 136. The printer 140 is preferably an ink-jet printer having at least one print head 141 located in a position to print a mark 16 on each vial 12 (FIG. 8) as each vial 12 is rotated and translated by the first conveyor 72, and preferably by the first and second conveyors 72 and 92. The printer 140 is connected to a printer controller 146 (FIG. 9) by a conductor 144. In the preferred embodiment, the printer 140 is an DOMINO SOLO 6 PRINTER supplied by DOMINO AMJET INC. of Gurnee, Ill. However, it is understood by those of ordinary skill in the art from the present disclosure that other types of printers may be used, if desired, such as a laser jet printer or an ink pad impression printer. It is also understood by those of ordinary skill in the art from the present disclosure that the linear motion table 132 can be located in other positions and that the printer 140 may be mounted directly to the linear motion table 132 depending on its location. Additionally, it is similarly understood by those of ordinary skill in the art that additional supports can be provided along the length of the beam 136 to damp unwanted motion due to vibration.

Figure 9:
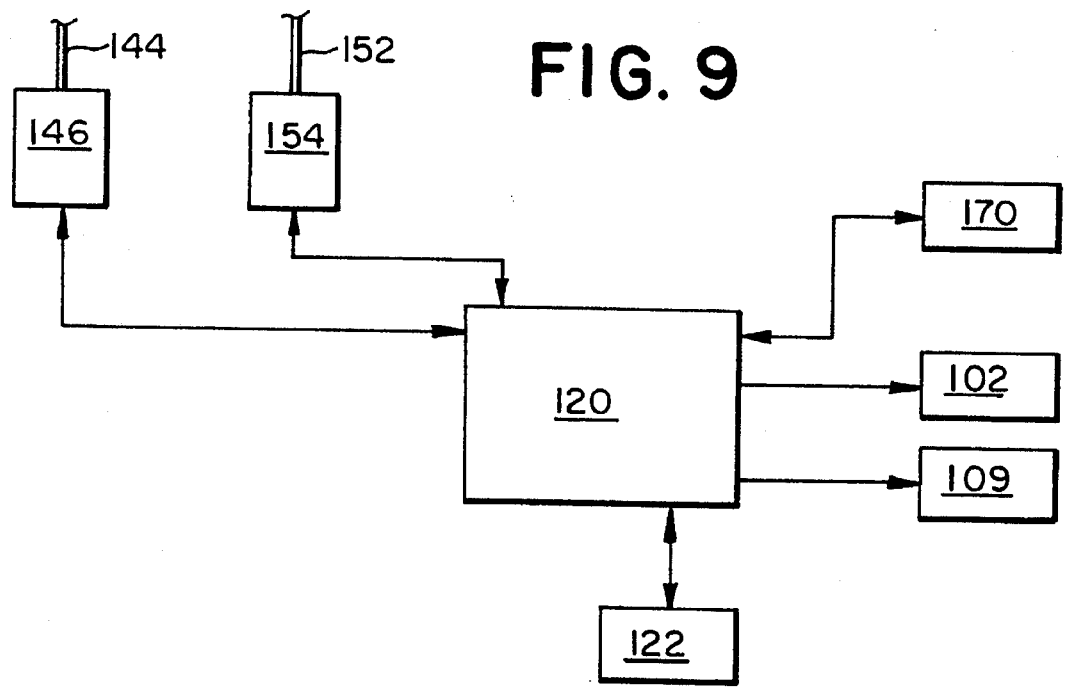
FIG. 9 is a block diagram of the controller.

Referring now to FIGS. 1, 3 and 4, the marking and verifying apparatus 10 further comprises a scanner 150 mounted on the transport assembly 130. The scanner 150 is located in a position to scan the printed mark 16 on each previously printed vial 12 as the vial 12 is translated and rotated by the first conveyer 72, and preferably by the first and second conveyors 72 and 92. The scanner 150 is mounted on the bracket 142 adjacent to the printer 140 with the scan head located in a position adjacent to the path of the vials 12, in an aligned position with the aluminum seals 14. In the preferred embodiment, the distance between the center line of the print head and the center line of the scan head is approximately 10.2 cm (4.0 inches) or twice the pitch of the vials 12. The scanner 150 generates a scan signal which is carried through a connecting conductor 152 to a scanner controller 154 (FIG. 9). The scanner controller 154 receives the scan signal and verifies if the mark 16 is correct and outputs a signal to the system controller-120. In the preferred embodiment, the scanner is a CCD camera and is preferably an ACUITY model #AS-CLRS-017 which is available from Acuity Imaging Inc. of Nashua, N.H. However, it is understood by those of ordinary skill in the art from the present disclosure that various types of scanners could be utilized, such as laser scanners, in order to scan the previously printed mark. Also some other type of scanner appropriate to read a mark applied can be used. Additionally, the scanner 150 could be mounted on a separate bracket (not shown) which is connected to the beam 136 or directly to the motion table 132, if desired.

Referring now to FIG. 3, the marking and verifying apparatus 10 further comprises an outfeed screw assembly 160 including an outfeed screw 162 mounted on a shaft 168 for rotational movement adjacent to the path of the vials 12 located on the outfeed side of the first conveyor 72. The outfeed screw assembly 160 is similar to the infeed screw assembly 56 and is attached to an outfeed conveyor 180 supported by a support column 158 (FIG. 1) affixed to the top 32 of the stand 20. The outfeed screw assembly 160 includes a gear box 164 which drives the outfeed screw 162, at the same speed as the infeed screw 58, through a gear 166 attached to the outfeed screw shaft 168. The upstream end of the outfeed screw 162 is located adjacent to the downstream side of the second conveyor assembly 90 on the outfeed side of the first conveyor assembly 70 in a position to engage the vials 12 and maintain the uniform distance between the consecutive the vials 12. In the preferred embodiment, the outfeed screw 162 is made from a polymeric material and has a pitch of approximately 5.0 cm (2.0 inches), which is equal to the pitch of the infeed screw 58 and the uniform pitch or spacing maintained by the first conveyor assembly 70. However, it is understood by those of ordinary skill in the art from the present disclosure that different pitches and speeds for the outfeed screw assembly 160 could be utilized, if desired, depending on the particular application. Additionally, the outfeed screw assembly 160 could be replaced by other types of conveyors, such as a linked roller belt (not shown), to maintain the spacing between the vials 12 as they are translated away from the printing and verifying stations provided by printer 140 and scanner 150 for further processing.

Still with reference to FIG. 3, the marking and verifying apparatus 10 further comprises an extractor assembly 170 located on the opposite side of the path of the vials 12 from the downstream end of the outfeed screw 162. The extractor assembly 170 is responsive to signals from the controller 120 FIG. 9 to extract the vials 12 on which a mark 16 is not verified. The extractor assembly 170 is preferably located on the outfeed side of the first conveyor assembly 70, in a position to receive the vials 12 as they are transported by the outfeed screw 162. The extractor assembly 170 is preferably of the type described in U.S. Pat. No. 4,596,107, which is incorporated herein by reference as if set fully set forth. The extractor 170 includes a star wheel 172 having a plurality of recesses 173 which are rotated in synchronous timing with the outfeed screw 162 such that each the vial 12 is aligned with a recess 173 as it is carried into contact the star wheel 172. The star wheel 172 includes a plurality of radially extending slots 175. Moveable pins 177 are located in the slots and each pin 177 is associated with a recess 173. Retaining elements 178 having two flexible fingers are located in a position adjacent to each recess 173 and connected to each associated protruding pin 175. A moveable actuator plate 179 is located in a position adjacent to the path of the vials 12 and above the star wheel 172 and is moveable between a first position above the pins 177 to a second position adjacent to the surface of the star wheel 172 such that a protruding pin 177 contacts a first edge of the actuator plate 179. The pin 177 which contacts the actuator plate 179 is moved radially outward in the associated slot 175 by the contact with the actuator plate 179 as the star wheel 172 is rotated such that the associated retaining element 178 is moved outward into a position where the flexible fingers resiliently grasp and retain the rejected vial 12a. A reject tray 174 is located adjacent to the extractor assembly 170 to receive the extracted vials 12. A rail 176 is located between the extractor assembly 170 and the reject tray 174 to dislodge rejected vials 12a from the grasp of the resilient fingers of the retaining element 178, allowing the pin 177 to travel back to the inboard position in the slot 175.

Still with reference to FIGS. 1 and 3, the marking and verifying apparatus 10 further comprises an outfeed conveyor 180 located downstream from the outfeed screw assembly 160 and the extractor assembly 170. The outfeed conveyor 180 has a moving belt 182 with adjustable outfeed guide rails 184 and 186 located on each side of the path to guide the vials 12 having verified marks 16. The outfeed guide rails 184 and 186 are mounted on adjustable mounts 188 which allow the outfeed guide rails 184 and 186 to be repositioned to accommodate larger or smaller sized the vials 12. Outfeed conveyors of this type are generally known to those of ordinary skill in the art, accordingly, further description is not provided. The outfeed conveyor 180 transports verified vials to a downstream conveyor 250 (in phantom) or other suitable destination for removal and/or further processing.

Referring to FIG. 1, an outfeed screw, conveyor and extractor assembly gearbox 189 is mounted on the stand 158 and synchronously drives the outfeed screw gearbox 164, the outfeed conveyor 180 and the extractor 170. The outfeed gearbox 189 is of the type generally well known to those of ordinary skill in the art, and, accordingly, no further description is necessary.

The drive system for the infeed and outfeed conveyors 48 and 180 and the infeed and outfeed screw assemblies 56 and 160 will be described in detail. As shown in FIG. 1, a drive motor/gear box assembly 190 is mounted inside the stand 20 on vibration-absorbing mounts 192 affixed to the base 24. A drive chain 194 is drivingly connected between the motor/gear box assembly 190 and a sprocket 196 affixed to the main drive shaft 198. The main drive shaft 198 is supported by a journal 199 mounted to the top 32 of the stand 20.

Figure 5:
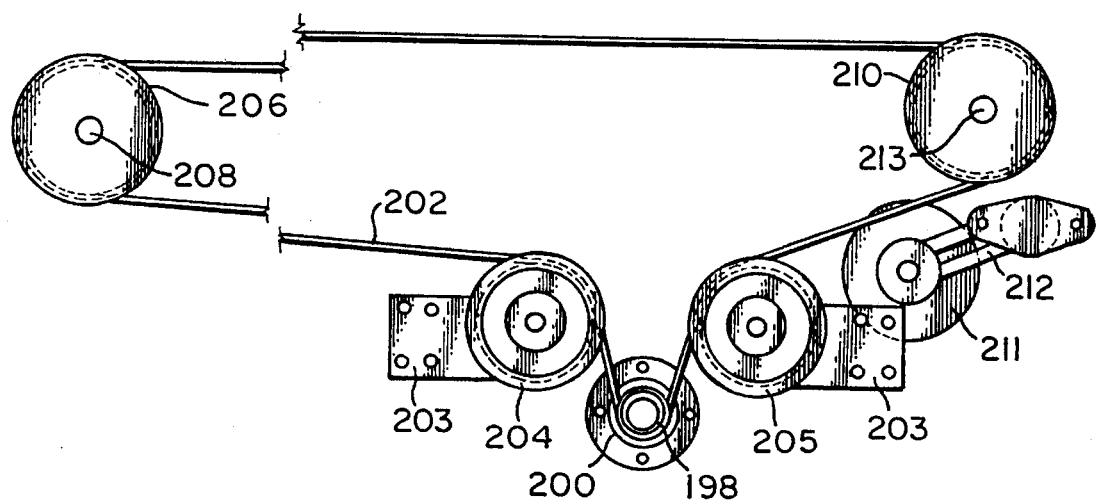
FIG. 5 is a top view taken along line 5—5 in FIG. 1.

Referring now to FIGS. 1 and 5, the main drive shaft 198 is connected to a first drive pulley 200. The first drive pulley 200 preferably drives a toothed drive belt 202 which extends around the first drive pulley 200, between guide pulleys 204 and 205, mounted on brackets 203, and around an infeed drive pulley 206 and an outfeed drive pulley 210. A tensioner pulley 211 is pivotally mounted on a bracket 212 to tension the belt 202. The infeed drive pulley 206 is attached to a shaft 208 which extends up through the support column 51 to drive the infeed conveyor/screw assembly gearbox 68 to drive the infeed conveyor 48 and the infeed screw 58. The outfeed drive pulley 210 is connected to a shaft 213 which drives the outfeed screw, conveyor and extractor gearbox 189 to drive the outfeed screw assembly 160, through the outfeed screw gear box 164, the extractor 170, and the outfeed conveyor 180 in a manner which is known to those of ordinary skill in the art.

Figure 6:
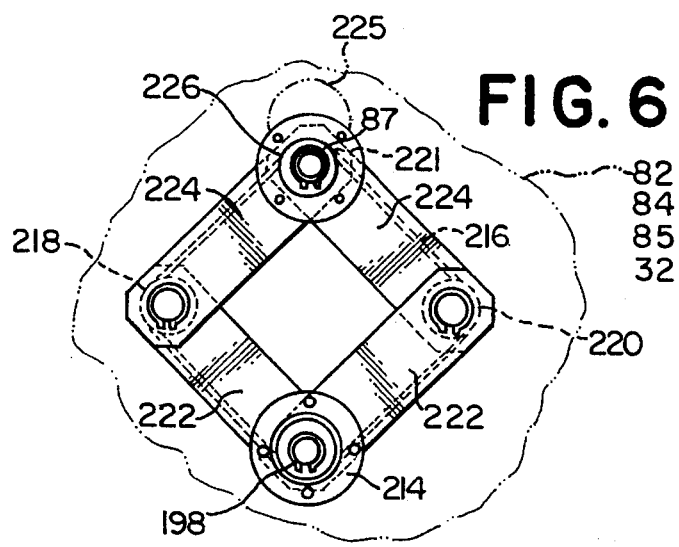
FIG. 6 is a top view taken along line 6—6 in FIG. 1

Referring now to FIGS. 1 and 6, the main drive shaft 198 is connected to a second drive pulley 214 which is located above the first drive pulley 200. A drive belt 216.(in phantom in FIG. 6) for the first conveyor assembly 70 and the transport assembly 130 is driven by the second drive pulley 214. The first conveyor drive belt 216 extends around the second drive pulley 214 around two guide pulleys 218, 220 and the first conveyor drive pulley 221 (all in phantom). The guide pulleys 218 and 220 are mounted on movable links 222 and 224 which scissor open and closed as the first conveyor assembly 70 is repositioned on the adjustable platform assembly 83 with the hand crank 89. The first conveyor drive pulley 221 is attached to the drive shaft 87.

Referring to FIG. 7, shaft 87 is supported by a journal 226 mounted on the base plate 82 of the first conveyor assembly 70, and moves with the adjustable platform assembly 83 to drive the first conveyor assembly 70 and the transport assembly 130. The drive shaft 87 extends through a slot 225 in the top 32 of the stand 20 and in the lower platform 85 to allow movement of the drive shaft 87 with the adjustable platform assembly 83.

Still with reference to FIG. 7, a gear 235 is mounted on the drive shaft 87. The gear 235 is in driving contact with a second gear 237 rotatably mounted on an idler shaft 238 attached to the base plate 82 of the first conveyor assembly 70. A post 239 is mounted on the second gear 237 and the second end of the link 138 is pivotally connected to the post 239. However, it is understood by those of ordinary skill in the art from the present disclosure that the gears 235 and 237 could be replaced with a cam and follower system (not shown) to drive the link 138 with a constant velocity over a fixed interval of the reciprocating movement for more accuracy.

Referring now to FIG. 9, a block diagram of the controller 120 is shown. The controller 120 is a programmable logic controller which is used to signal operating speeds to the parallel shaft gear motor 102 and the motor/gearbox 190 through motor controllers (not separately shown). The controller 120 also receives inputs from the printer controller 146 to verify that the printer 140 and the printer controller 146 are operating. The controller 120 receives a signal from the scanner controller 154 indicating whether each vial 12 has a mark 16 which has been verified. The controller 120 signals the extractor 170 to extract the vials 12 which do not have a verified mark 16 based on the signal from the scanner controller 154, the motor speeds, the known pitch of the vials 12 and the relative locations of the scanner 150 and the extractor 170. The controller 120 can be programmed by an operator interface 122, and data can be accessed from the controller 120, such as the number of vials 12 not having verified marks and total number of vials 12 processed. Preferably, the operator interface 122 is a touch screen of the type which is well known to those or ordinary skill in the art. It is understood by those of ordinary skill in the art that additional signals from warning devices and sensors are also directed to the controller 120 to shut down the apparatus 10 in case of jams, misfeeds or other problems. Additionally, it is similarly understood that the controller can receive additional input/output signals. For example, the motors 102 and 190 can provide feed back signals to the controller 120 to more accurately control the motor speeds.

Having described the structure of the marking and verifying apparatus 10, a brief description of its operation follows with reference to FIGS. 1–4 and 7.

Referring now to FIGS. 2–3, the marking and verifying apparatus 10 is first set up by adjusting the position of the infeed guide rails 44 and 46, by loosening the adjustable supports 47 and spacing the infeed guide rails 44 and 46 the proper distance apart so that an vial 12 of the desired diameter will fit between the infeed guide rails 44 and 46 with a clearance. The position of infeed screw assembly 56 is also adjusted inward or outward from the path of the vials 12 with the adjusting knobs 64 so that the infeed side of the infeed screw 58 is in alignment with the infeed guide rail 44. The position of the first conveyor assembly 70 is adjusted by turning the hand crank 89 to move the adjustable platform 83 with the first conveyor assembly 70 mounted thereon inward or outward from the path of the vials 12 to maintain the proper alignment with the infeed guide rail 46 and position the first conveyor 72 on the side of the path defined for the vials. The position of the second conveyor assembly 90 is adjusted inwardly or outwardly by turning the hand crank 118 attached to the adjustable platform 108 such that the second conveyor belt 92 on an opposite side of the vials 12 from the first conveyor 72 is in a position to engage the opposite sides of the vials 12 from the conveyor 72 of linked vertical rollers 71 of the first conveyor assembly 70 to cooperate to rotate the vials at known translational and rotational velocities. The printer 140 and the scanner 150 are positioned on the bracket 142 attached to the beam 136 to properly locate the print head and the scan head. The location of the outfeed screw assembly 160 is adjusted in a similar fashion to the infeed screw assembly 56, and accordingly further description is not required. The outfeed guide rails 184 and 186 are adjusted in a similar fashion to the infeed guide rails 44 and 46 by means of the adjustable supports 188.

Once the marking and verifying apparatus 10 has been set up for a vial 12 of a given size, power is provided to the motor gear box 190, the parallel shaft gear motor 102, the printer 140, the scanner 150 and the controller. Power from the motor gear box 190 is translated by the chain 194 through the main drive sprocket 196 to the main drive shaft 198 which turns the first and second drive pulleys 200 and 214. Drive belt 202 on the first drive pulley drives the infeed drive pulley 206 and the outfeed drive pulley 210 to provide power to the infeed conveyor/screw assembly gear box 68 and the outfeed screw, conveyor and extractor gearbox 189 which drives the outfeed screw 160, the outfeed conveyor 180, and extractor 170. The second drive pulley 214 drives the first conveyor drive belt 216 to turn the first conveyor drive pulley 221 affixed to the drive shaft 87 for the first conveyor assembly 70, turning attached sprockets 78, chain 74 and sprocket 76 to drive the conveyor 72 of linked vertical rollers 71. The drive shaft 87 also drives gears 235 and 237 to provide reciprocating motion through the link 138 for the transport assembly 130, moving the carriage 134 and the beam 136 in a linear reciprocating motion parallel to the path of the vials 12. The linear reciprocating motion is synchronized with the movement of the linked vertical rollers 71 of the first conveyor 72, the infeed screw assembly 56, the outfeed screw assembly 160, and the extractor 170.

The parallel shaft gear motor 102 drives the belt 92 on the second conveyor 90 at a different speed than the conveyor of linked vertical rollers 72 on the first conveyor assembly 70. The second conveyer belt 92 of the second conveyor assembly 90 preferably rotates in the same downstream direction as the rollers 71 of the first conveyor 72. However, the second conveyor 92 can be a counter-rotating conveyor with the conveyor 92 travelling in the upstream direction, opposite to the direction of the conveyor 72 of linked vertical rollers 71 of the first conveyor assembly 70. The speed of the motor 102 is adjusted to adjust the rotational velocity of the vials 12.

As sealed pharmaceutical vials 12 are carried by the upstream conveyor 34, shown in FIG. 2, toward the marking and verifying apparatus 10, they are directed between the infeed guide rails 44 and 46 and onto the infeed conveyor belt 49 of the infeed conveyor assembly 48. The rate of the incoming vials 12 is not limited and the vials are stopped by solenoid actuated stop pin 50 before reaching the upstream side of the infeed screw 58. Preferably, the rate of incoming vials from the upstream conveyor 35 is 320 vials per minute or less for the described printer 140 and camera 150. Each vial 12 is carried downstream by the infeed conveyor 48 and sequentially released by the solenoid 52 acting on the stop pin 50, which retracts the pin 50 from the path formed between the infeed guide rails 44 and 46. As each vial 12 is released by the stop pin 50, it is moved forward by the conveyor belt 48 further downstream and engaged by the infeed screw 58. As the infeed screw 58 rotates, it translates the vials 12 forward and establishes a uniform spacing between the vials 12 on the path, based on the pitch of the infeed screw 58. The infeed screw 58 delivers the vials 12 to the first conveyor assembly 70, where the conveyor 72 of linked vertical rollers 71 engages the sides of each vial 12, with each vial 12 being placed between two adjacent linked rollers 71. The vials 12 are translated downstream by the linked vertical rollers 71 on the first conveyor assembly 70 which maintain the spacing between adjacent vials 12. As the vials 12 are translated downstream by the conveyor 72 of linked vertical rollers 71 on the first conveyor assembly 70, the opposite side of each vial 12 from the first conveyor assembly 70 is engaged by the belt 92 of the second conveyer assembly 90. The belt 92 of the second conveyer 90 is moving at a different speed than the linked roller elements 71 of the first conveyor assembly 70, causing each vial 12 to simultaneously rotate as it is translated at a predetermined translational velocity. The translational velocity is determined by the speed of the first conveyor assembly 70, and the rotational velocity is determined by the relative speeds of the first and second conveyor assemblies 70 and 90.

The printer 140, which is affixed to the beam 136, is translated along the path of the vials 12 in a synchronous cyclic or reciprocating motion such that the print head on the printer 140 is maintained at the predetermined translational velocity and at a uniform distance from the periphery of the aluminum seal 14 on each vial 12 for a small time interval of each cycle as each vial 12 is translated and rotated past the printing station. As each vial 12 is translated and rotated, a mark 16 is printed on the aluminum seal 14. Translating the printer 140 at approximately the same velocity as the predetermined translational velocity of each vial 12 as the mark 16 is being printed cancels the effect of the translatory movement of the vial 12, and the printer 140 is effectively printing a mark 16 on a surface not translating only rotating with respect to the print head.

The scanner 150 is translated along the path of the vials 12 in synchronous motion with the printer 140. The distance between the scan head on the scanner 150 and the print head on the printer 140 is a fixed distance, and the speed of the second conveyor belt 92 is adjusted by changing the speed of the parallel-shaft gear motor 102 which drives the second conveyor belt 92 such that each vial 12 is rotated at least one full rotation (approximately 360 degrees), or a multiple integer of full rotations as it is translated the fixed distance. In the preferred embodiment, the distance is approximately 10.2 cm (4.0 inches). Because the vial 12 has been rotated approximately 360 degrees as the vial 12 is translated the distance, the mark 16 on each vial 12 will be aligned with the scan head when it reaches the scanner 150. The mark 16 printed on the aluminum seal 14 of each vial 12 is thus scanned immediately after it has been applied. The scanning and printing is carried out simultaneously on different vials 12. In the preferred embodiment, the scanning and printing are carried out simultaneously on vials 12 which are separated by a vial 12 which is in transit between the printer 140 and scanner 150. This is because the pitch of the infeed screw 58 and the conveyor of linked vertical rollers is approximately 5.1 cm (2.0 inches) and the distance between the print head on the printer 140 and the scan head on the scanner 150 is approximately 10.2 cm (4.0 inches). However, it is understood by those of ordinary skill in the art that the scanner 150 may be positioned and the speed of the second conveyor belt 92 adjusted such that consecutive vials 12 are simultaneously printed and scanned or such that a vial 12 which is two or more spaces downstream from the vial 12 which is being printed is simultaneously being scanned.

The scanner 150 generates a signal of the mark 16 which is being read. The signal is transmitted through conductor 152 to a controller 120 which verifies the legibility and data content of the mark 16 which was scanned. After each vial 12 is scanned, it is carried further downstream by the first conveyor assembly 70 to the outfeed screw 162, which maintains the spacing between the vials 12 as they are translated toward the extractor assembly 170.

The extractor assembly 170 contacts each vial 12 as it exits the outfeed screw 162. Based on the known spacing between each vial 12, the controller 120 signals the extractor assembly 170 to remove vials 12a with unverified marks 16 from the vial path and place them in the reject tray 174. When a vial 12a is to be rejected, the controller 120 actuates the actuator plate 178 to move to the second position as the recess 173 for the rejected vial 12a is being rotated into contact with the rejected vial 12a. The pin 177 associated with the designated recess 173 contacts the actuator plate 178, causing the pin 177 and its associated retaining element 178 to move radially outward such that the resilient fingers on the retaining element 178 resiliently grasp the vial 12a to be rejected. As the star wheel 172 is rotated, the rejected vial 12a is carried off of the vial path to the reject tray 174 where the vial 12a contacts the rail 176 on the side of the reject tray 174, releasing the vial 12a from the retaining element 178.

Vials 12 with verified marks 16 are carried further downstream by the outfeed conveyor 182 between outfeed guide rails 184 and 186 to a next downstream conveyor 250, which conveys the vials 12 which have been marked and verified on further processing.

It will be appreciated by those skilled in the art that changes could be made to the embodiment described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An apparatus for applying and verifying a mark on the periphery of generally cylindrically-shaped objects traveling on a path, the apparatus comprising:

at least a first conveyor mounted for movement on a first side of the path, the first conveyor being located to engage the objects to translate the objects at a known translational velocity along the path;

a transport assembly mounted for cyclic movement back and forth along a transport assembly path parallel to the path of the objects at least part of the cyclic movement being approximately at the known translational velocity of the objects;

a mark applicator mounted on the transport assembly and is located in a position to apply a machine readable mark on each object as each object is translated by the first conveyor;

a sensor mounted on the transport assembly and being located in a position to read the applied mark on each previously marked object as the object is translated by the first conveyor, and to generate a signal representative of the read mark.

2. The apparatus of claim 1 further comprising a second conveyor mounted for movement on an opposite side of the path from the first conveyor, the second conveyor being located to engage an opposite side of the objects from the first conveyor, the first and second conveyors cooperating to rotate and translate the objects at the known translational velocity at a known rotational velocity along the path.

3. The apparatus of claim 1 further comprising a controller which receives the signal of the sensor and verifies if the mark is correct.

4. The apparatus of claim 3 further comprising an extractor, responsive to signals from the controller, to extract objects with an unverified mark.

5. The apparatus of claim 3 further comprising an extractor, which is responsive to signals from the controller, located in a position to receive the objects.

6. The apparatus of claim 1 wherein the first conveyor has an infeed side, and the apparatus further comprises an infeed screw mounted for rotational movement adjacent to the path of the objects, the infeed screw being located on the infeed side of the first conveyor in a position to engage consecutive objects and space the objects a uniform distance apart as they enter the infeed side of the first conveyor.

7. The apparatus of claim 6 wherein the mark applicator comprises a print head and the sensor comprises a scanner, the print head and scanner are located a predetermined distance apart on the transport assembly and the predetermined distance is approximately equal to an integer multiple of the uniform distance between the objects.

8. The apparatus of claim 7 wherein each object is rotated an integer multiple of approximately 360° as the object is translated a distance equal to the uniform distance by the first conveyor.

9. The apparatus of claim 1 wherein the first conveyor has an infeed side, and the apparatus further comprises means for spacing the objects a uniform distance apart as consecutive objects enter the infeed side of the first conveyor.

10. The apparatus of claim 9 wherein the mark applicator comprises a print head and the sensor comprises a scanner and the print head and the scanner are located a predetermined distance apart on the transport assembly and the predetermined distance is approximately equal to an integer multiple of the uniform distance between the objects.

11. The apparatus of claim 10 wherein the each object is also rotated an integer multiple of approximately 360° as the object is translated a distance equal to the uniform distance by the first conveyor.

12. The apparatus of claim 1 wherein the first conveyor has an outfeed side and the extractor is located on the outfeed side of the first conveyor.

13. The apparatus of claim 1 wherein the first conveyor has an outfeed side, and the apparatus further comprises an outfeed screw mounted for rotational movement adjacent to the path of the objects, the outfeed screw being located on the outfeed side of the first conveyor in a position to engage consecutive objects and maintain uniform distance between consecutive objects.

14. The apparatus of claim 1 wherein the sensor comprises a CCD camera.

15. The apparatus of claim 1 wherein the mark is a matrix code.

16. An apparatus for applying and verifying a mark on the periphery of generally cylindrically-shaped objects traveling on a path, the apparatus comprising:

a conveyance system configured to translate and rotate the objects at a known translational velocity and a known rotational velocity along the path;

a transport assembly located adjacent to the path of the objects, and mounted for cyclic movement back and forth along a transport path parallel to the path of the objects at least part of the cyclic movement being approximately at the known translational velocity of the objects;

a printer mounted on the transport assembly and having at least one print head being located in a position to print a mark on each object as each object is rotated and translated;

a scanner mounted on the transport assembly and being located in a position to scan the printed mark on each previously printed object as the object is translated and rotated by the conveyance system, and to generate a scan signal.

17. A method for applying and verifying printed marks on the periphery of generally cylindrically-shaped objects traveling on a path, the method comprising the steps of:

(a) uniformly spacing the objects on the path;

(b) translating the objects along the path at a predetermined translational velocity;

(c) translating a printer along the object path;

(d) printing a mark on the periphery of a first object as the object is being translated;

(e) translating a scanner along the object path;

(f) scanning the mark printed on the first object after it has been printed as the object is being translated;

(g) simultaneously performing steps (d) and (f) on consecutive objects.

18. The method of claim 17 further comprising the step of rotating the object as it is being translated during steps (c), (d) and (e).

19. The method of claim 18 further comprising the step of:

(h) verifying the mark scanned in step (f).

20. The method of claim 19 further comprising the step of:

(i) extracting objects which do not have a verified mark.

* * * * *